United States Patent [19]

Henrion

[11] Patent Number: 5,418,780
[45] Date of Patent: * May 23, 1995

[54] ROUTING LOGIC MEANS FOR A COMMUNICATION SWITCHING ELEMENT

[75] Inventor: Michel A. R. Henrion, Brussels, Belgium

[73] Assignee: Alcatel N.V., Amsterdam, Netherlands

[*] Notice: The portion of the term of this patent subsequent to Aug. 17, 2010 has been disclaimed.

[21] Appl. No.: 668,582

[22] Filed: Mar. 13, 1991

[30] Foreign Application Priority Data

Mar. 14, 1990 [EP] European Pat. Off. ............ 90200594

[51] Int. Cl.⁶ ............................................. H04L 12/56
[52] U.S. Cl. .................................... 370/60.1; 340/826
[58] Field of Search ........................ 370/60, 58.1, 58.2, 370/58.3, 60.1, 53, 54; 379/271, 272; 340/826, 827, 825.8

[56] References Cited

U.S. PATENT DOCUMENTS

| | | | |
|---|---|---|---|
| 4,550,397 | 10/1985 | Turner et al. | 370/94.1 |
| 4,630,260 | 12/1986 | Toy et al. | 370/60 |
| 4,651,318 | 3/1987 | Luderer | 370/94 |
| 4,734,907 | 3/1988 | Turner | 370/60 |
| 4,829,227 | 5/1989 | Turner | 370/60 |
| 4,849,968 | 7/1989 | Turner | 370/60 |
| 4,899,334 | 2/1990 | Shimizu | 370/60 |
| 4,901,309 | 2/1990 | Turner | 370/60 |
| 5,237,565 | 8/1993 | Henrion et al. | 370/60.1 |

FOREIGN PATENT DOCUMENTS

0260364 3/1988 European Pat. Off.
8603355 6/1986 WIPO.

OTHER PUBLICATIONS

G. B. Mund, et al., "A 2×2 Switching Element for Broadband ISDN", IEEE Pacific Rim Conf. on Comm., Computers & Signal Proc., Jun. 1–2, 1989.

Primary Examiner—Stephen Chin
Assistant Examiner—T. Ghebretinsae
Attorney, Agent, or Firm—Robbins, Berliner & Carson

[57] ABSTRACT

Routing logic (RL) for a communication switching element (ISE) of a self-routing multi-stage switching network and able to transfer cells or packets of information from any of its inlets (I1/32) to any of its outlets (O1/32). The outlets of the switching element are arranged in routing groups containing one or more of them and of which the identity is derived by the routing logic from an output-port-address (OPA) identifying an output of the switching network and contained in the self-routing-tag (SRT) associated to the cell. This cell is then transferred to one of the outlets belonging to the selected routing group. The routing logic (RL) is also able to control the transfer of a cell through the switching element according to the execution of a predetermined routing function selected amongst a plurality of routing functions (RS, DI, MC, BH, IS). This routing function to be executed is selected by the routing logic according to a routing-control-code (RCC) also contained in the self-routing-tag (SRT) and each value thereof identifies a specific transfer pattern constituted by a predetermined sequence of routing functions to be executed in the switching elements (ISE) through the switching network (SN).

13 Claims, 3 Drawing Sheets

ROUTING LOGIC MEANS FOR A COMMUNICATION SWITCHING ELEMENT

TECHNICAL FIELD

The present invention relates to routing logic means for a communication switching element of a self-routing multi-stage switching network, said switching element being able to transfer information from any one of a plurality of inlets thereof to at least one of a plurality of outlets thereof according to routing data included in a self-routing tag associated to said information.

This application is based on and claims priority from applications first filed in Europe under Application No. 90200594.1. To the extent such prior application may contain any additional information that might be of any assistance in the use and understanding of the invention claimed herein, it is hereby incorporated by reference.

BACKGROUND ART

Such routing logic means are already known in the art, e.g. from the U.S. Pat. No. 4,550,397. Therein, they are associated to binary switching elements, i.e. having two inlets and two outlets, forming part of a multi-stage switching network which has a distribution part and a routing part. These known routing logic means can allow the transfer of the information to any of the two outlets or to only one of these outlets in function of the routing data. The first case of transfer is executed when the switching element belongs to the distribution part of the switching network, whilst the case is executed when this switching element belongs to the routing part of this switching network. In this first case a flip-flop is used to alternately indicate the one of the two outlets to be used, whilst in the second case this flip-flop is not used. This means that the known routing logic means are only able to transfer the information in two possible ways, the selection among them is governed by the use or not use of a flip-flop, i.e. according to the fact that the switching element belongs to the distribution part or to the routing part of the network respectively.

DISCLOSURE OF INVENTION

An object of the present invention is to provide routing logic means of the above type, but which can be associated to switching elements of larger size, i.e. with a larger number of inlets and/or outlets. With such switching elements of larger size, the routing logic means should be able to perform routing in such a way as to transfer the information through the switching network over a multiplicity of possible paths (instead of a single deterministic path) in order to increase both performance and reliability of information transfer through that switching network.

According to the invention this object is achieved due to the fact that said switching element is provided with at least three of said outlets, that in each of said switching element said outlets are arranged in at least one routing group, each of said routing groups including from one to all of said outlets, that said routing logic means select at least one of said routing groups by deriving the identity thereof from said routing data which contains at least one output-port-address of said switching network, and that said information is transferred to one of said outlets belonging to each of said selected routing group.

In this way the switching elements themselves perform a "multi-path" routing since groups of outlets (routing groups) are selected by the routing logic means instead of individual outlets. Then, one obtains a multi-path self-routing switching network wherein the selection of the group of outlets (routing group) to be used in each switching element is derived from the output-port-address in the self-routing tag, thus providing a relatively large range of possible paths to transfer the information. Indeed, since the routing groups are not limited to include either one or all the outlets but may include any number of them, there are much more transfer possiblities than these which are only associated to the fact that the swicthing element pertains to the distribution or to the routing part of the switching network, The present invention also relates to routing logic means fop a communication switching element of a self-routing multi-stage switching network, said switching element being able to transfer information from any one of a plurality of inlets thereof to at least one of a plurality of outlets thereof according to the execution of a predetermined routing function selected by said routing logic means amongst a plurality of routing functions.

Referring again to the above cited U.S. patent, the routing logic means of the switching elements thereof are only able to execute two different routing functions: a first one in which the transfer of the information to either one of the two outputs is allowed, and a second one in which this choice is not authorized.

Another object of the present invention is to provide routing logic means of the above type, but which allow either one of a relatively more considerable number of routing functions to be selected in a flexible way.

According to the invention this other object is achieved due to the fact that said switching element is provided with at least three of said outlets and that said information is associated to a self-routing tag including a routing-control-code which, in each of said switching elements, is used by said routing logic means to select one of said routing functions to be executed, each value of said routing-control-code identifying a specific transfer pattern constituted by a predetermined sequence of routing functions to be executed by said switching elements through said switching network.

In this way a given routing-control-code value allows the execution of a different routing function in each of the switching elements of the switching network through which the information is transferred. Moreover, the routing function executed is then no more only dependent on the fact that the switching element pertains to the distribution part or to the routing part of the switching network. This allows thus the choice between a relatively large number of possible routing functions.

BRIEF DESCRIPTION OF DRAWINGS

The above mentioned and other objects and features of the invention will become more apparent and the invention itself will be best understood by referring to the following description of an embodiment taken in conjunction with the accompanying drawings wherein.

BEST MODE FOR CARRYING OUT THE INVENTION

Figure 1:
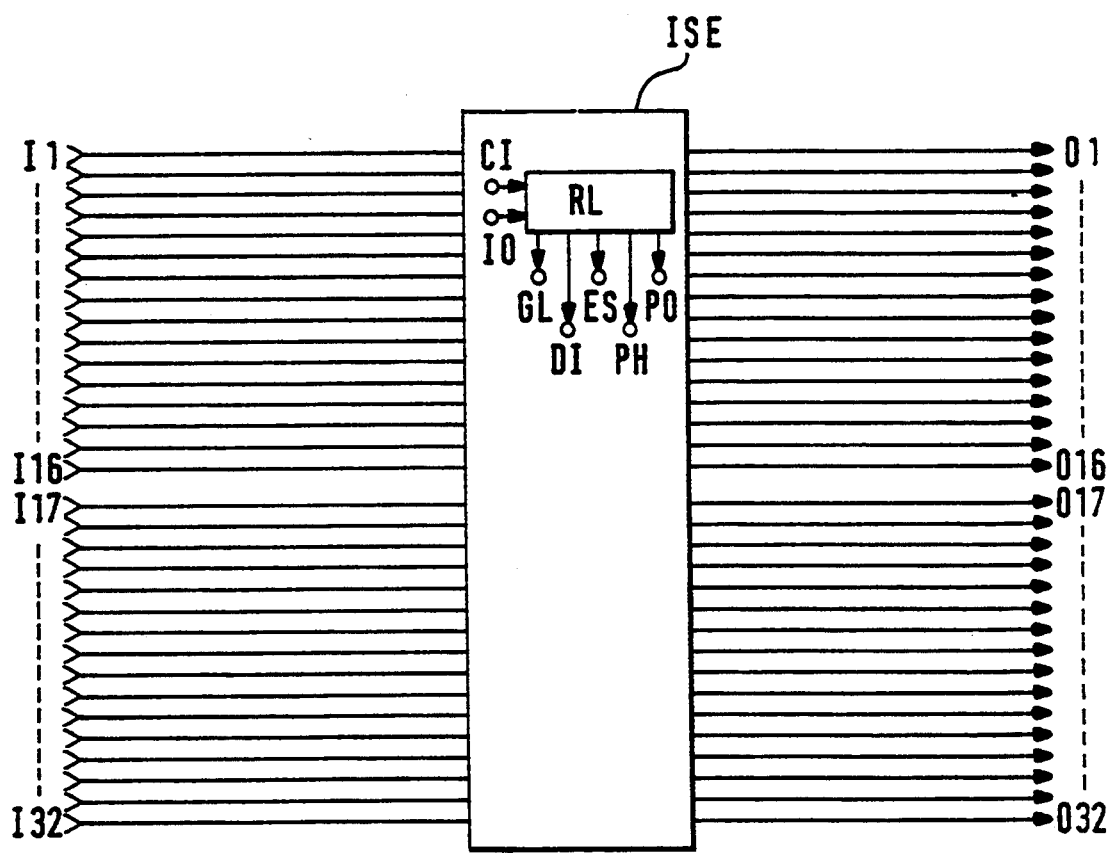
FIG. 1 shows a communication switching element ISE including routing logic means RL according to the invention.

The communication switching element ISE schematically shown in FIG. 1 is for instance of the type disclosed in commonly assigned allowed patent application filed on 9 Aug. 1990 under Ser. No. 07/565,310 and claiming priority from PCT application PCT/EP/000942 (HENRION 18), which is hereby incorporated by reference. It can be used to build up various stages of a folded or non-folded multi-path self-routing switching network, e.g. of the type disclosed in the co-pending patent application filed under Ser. No. 07/776,337 (now U.S. Pat. No. 5,237,565, which claims priority from an application filed in France on 14 Mar. 1990) and entitled "MULTIPLE PATH, SELF-ROUTING SWITCHING NETWORK FOR SWITCHING ASYNCHRONOUS TIME DIVISION MULTIPLEX CELLS".

When such multi-path self-routing switching networks are "asymmetrical", i.e. have one single transfer direction from all inlets to all outlets, all the switching elements thereof, such as ISE shown in FIG. 1, are unidirectional, i.e. perform routing operations in a single direction from a single set of inlets I1/32 to a single set of outlets O1/32.

Figure 2:
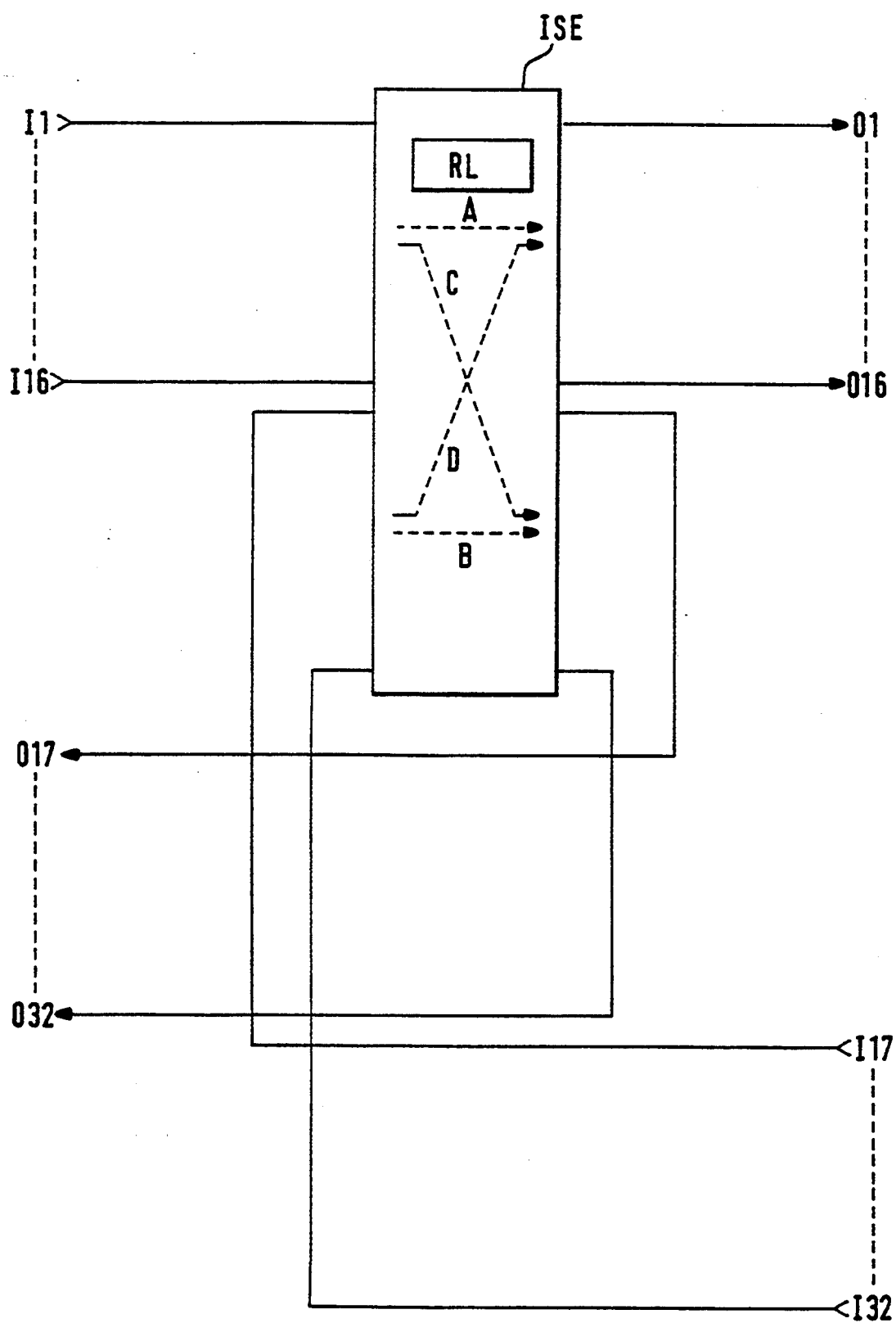
FIG. 2 is a principle connection circuit of a switching element ISE as in FIG. 1 and having bidirectional and reflection capabilities.

When such switching networks are "symmetrical", i.e. have both incoming or first transfer direction and outgoing or second transfer direction handled by the same switching elements ISE, and when they are non-folded, each of these switching elements ISE is arranged, as shown in FIG. 2, by splitting its inlets I1/32 in two sets: one for the incoming direction (A), e.g. I1/16, and one for the outgoing direction (B), e.g. I17/32, as well as its outlets O1/32 in two sets: one for the incoming direction (A), e.g. O1/16, and one for outgoing direction (B), e.g. O17/32. In this case, "reflection", i.e. change of internal transfer direction (C, D), can be executed in any switching element stage. This will be explained in more detail later.

When such switching networks are symmetrical and folded, all switching element stages except the middle ("mirror") stage, are handling both incoming (A) and outgoing (B) transfer directions and may also perform a reflection—then called "early" reflection—, whereas the middle ("mirror") stage (which is unidirectional, i.e. without split of the inlets and the outlets in two sets) naturally performs a systematic reflection for cell transfer from incoming to outgoing direction in the switching network.

In more detail and when using switching elements ISE for two internal transfer directions, the inputs or inlets I1 to I32 as well as the outputs or outlets O1 to O32 of these switching element ISE can be arranged as shown in FIG. 2, i.e. they are each grouped in first and second sets I1/16 and I17/32 as well as O1/16 and O17/32 respectively. Internally, the switching element ISE is only able to transfer a cell of information in an unidirectional way, i.e. from left to right as shown in FIG. 1, but externally it allows the transfer of such cells in a bidirectional way, i.e. from left to right or from right to left. More particularly, in case there is no reflection, cells can be tranferred from the inlets of the first set I1/16 or these of the second set I17/32 to any of the outlets of the first set O1/16 or of the second set O17/32 according to the first (A) or the second (B) transfer direction respectively, whereas in case of reflection, cells can be transferred from the former inputs to any of the outlets of the second set O17/32 or the first set O1/16 according to the third (C) and the fourth (D) transfer direction respectively.

Figure 3:
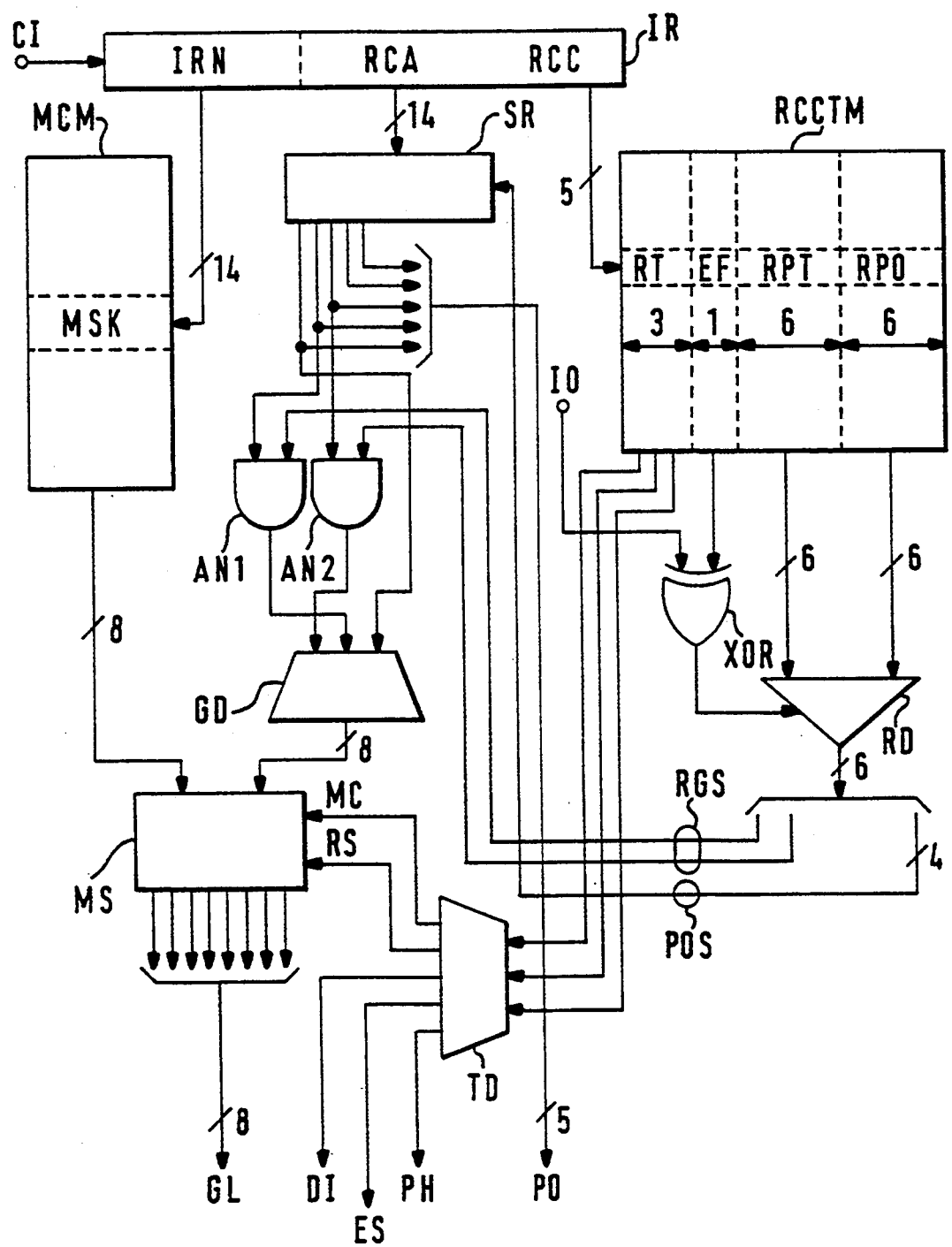
FIG. 3 represents the routing logic means RL of FIG. 1 and FIG. 2 in more detail.

The inlets of the first set I1/16 can be identified by a direction indicator or bit IO at a particular binary status, e.g. at the logical level 0, whilst those of the second set I17/32 are identified by the opposite binary status, e.g. 1, of this bit IO. The various direction bits IO are for instance provided by flip-flops (not shown) which are associated to respective ones of the inlets I1/32 and whose outputs are coupled to the inputs of a multiplexer (not shown) having as output the direction indicator IO which is applied to a like-named input to the routing logic RL (FIG. 3). This multiplexer is for instance controlled by an input clock signal (not shown) which allows the flip-flop outputs to be successively coupled to the output IO. This clock signal is for instance the same as the one used for successively coupling the inlets I1/32 of the switching element ISE to the input CI (FIG. 3) of the routing logic circuit or means RL as described in the above PCT application.

The above outlets O1/32 of the switching element ISE are also grouped in so-called routing groups, any of the outlets of each of these routing groups allowing access to a requested output transfer direction in the switching network, i.e. towards an output of the switching network which is identified by an output-port-address OPA, contained in an address field also called Routing Control Address RCA of a control header called self-routing tag SRT associated to the cell of information. In the present case and as an example these outlets O1/32 are supposed to be grouped in one (also called distribution group), two, four or maximum eight routing groups each comprising for instance 32, 16, 8 or 4 outputs respectively. It is to be noted that a same outlet O1/32 may even form part of several routing groups and that it is also possible to have 32 routing groups each comprising only one outlet O1/32.

The switching element ISE is able to switch cells or packets of information on the basis of routing data included in the self-routing tag SRT forming part of the control header of these cells and under the control of the routing logic circuit RL shown in FIG. 3. More particularly, the switching element ISE is able to switch either mono-slot cells of fixed length, each having a header with a self-routing tag SRT, or cells of fixed or variable length called "Multi-Slot-Cells" (MSC) constituted by a series of successive subcells of equal length. In the latter case the first subcell contains the multi-slot cell (MSC) header, i.e. the self-routing tag SRT.

As will be described later, from the analysis of the self routing tag SRT of a cell or of a first subcell and more particularly of a portion of the address field or part thereof, the routing logic circuit RL derives the following routing enable signals which are each indicative of a routing function or operation to be performed:

- a "group-routing" enable signal RS which is activated when a cell transfer from an inlet I1/I32 to a single one of the above routing groups has to be performed. This routing function is to be performed in case of point-to-point transfer and called point-to-point routing;
- a "multicast-routing" enable signal or indicator MC which is activated when a cell transfer from an inlet I1/I32 to a plurality of the above routing groups has to be realized. This routing function is to be executed in case of point-to-multipoint transfer;

a "distribution" enable signal or indicator DI which is activated when a cell has to be transferred to any of all the 32 outlets in case of ISE used unidirectionally or any of all the 16 outlets of one set of outlets in case of ISE used bidirectionally.

Because any of the 32 or 16 outlets O1 to O32 or O16 may be selected, the use of this distribution indicator DI is preferred to the selection of a single routing group comprising these 32 or 16 outlets although a same result is obtained thereby. This routing function may for instance be used in a distribution part of the above mentioned multi-path self-routing switching network which may typically comprise a first or distribution part followed by a second or routing part;

a dedicated-routing enable signal or indicator ES which is activated when a cell transfer has to be performed from an inlet I1/32 to a dedicated outlet (not shown) used for a special control purpose and distinct from the above outlets O1/32. This routing function is called dedicated routing; and a "physical-routing" enable signal or indicator PH which is activated when a cell transfer from an input to a predetermined outlet O1/32, also called physical output, has to be performed. This routing function, also called directed routing, causes a so-called physical transfer of the cell to one outlet and may for instance be used for test purposes.

In the example selected for description, the routing logic circuit RL also provides the following output signals:

a routing group output signal GL which identifies a single routing group or a plurality of routing groups among the maximum of 8 possible routing groups, depending on the enabling signal RS or MC being activated respectively;

an output identity signal PO which indicates the identity of a selected physical output among the 32 outlets O1 to O32 and is used when the corresponding enabling signal PH is activated.

In the present example, the routing logic circuit RL has inputs CI, IO and outputs GL, DI, ES, PH and PO and includes the following elements which are interconnected as shown in FIG. 3:

a 33-bit input register IR with input CI and intended to store the self-routing tag SRT of each cell received at an inlet I1/32 of the switching element ISE;

a routing-control-code-translation memory RCCTM, storing 32 16-bit data words constituted by routing parameters corresponding to different routing operations able to be executed by the switching element ISE for various possible transfer patterns. Each of these data words comprises a 3-bit routing type code RT, a reflection indicator or bit EF, a 6-bit "incoming" routing group field RPI and a 6-bit "outgoing" routing group field RPO, RPI and RPO constituting two sets of routing-mode parameters;

a multicast-branch-point memory MCM storing a plurality of 8-bit mask words MSK each corresponding to a multi-cast tree and containing the identities of a plurality of routing groups corresponding to the branches of that tree at that switching stage;

a routing function decoder TD to decode the routing type code RT into the above mentioned enable signals or indicators RS, MC, DI, ES, PH from the RCCTM memory selected by the Routing-Control-Code RCC forming part of the self-routing tag SRT and received in the input register IR;

a direction selector RD to select either the incoming or outgoing routing group field RPI or RPO, i.e. the first RPI or the second RPO set of routing-mode parameters respectively, from a data word of the memory RCCTM, under the control of the reflection indicator or bit EF and of the direction indicator or bit IO:

a selector MS having two sets of 8 inputs and a routing group output GL also constituted by a set of 8 output wires each assigned to a distinct one of the 8 possible routing groups. MS allows either one of these two sets of 8 input wires to be connected to the set of 8 output wires. The above mentioned routing group output signal GL is generated on this like-named output;

a 14-bit shift register SR having a multiple output PO constituted by 5 wires. In case the routing function "physical-routing" (PH) is selected, these 5 wires carry corresponding bits of the binary address or identity of the physical output O1/32 to be selected. This means that the above mentioned output identity signal PO is provided on this like named output. In case the routing function "group-routing" RS is selected, a variable number of bits, from 1 to 3 in this example with 8 routing groups maximum, gives the routing group identity to be used for routing;

a group number decoder GD;

an exclusive-OR gate XOR; and two AND gates AN1 and AN2.

The above routing logic circuit RL operates as follows.

When an information cell with a header containing a self routing tag SRT is applied to one of the inlets I1/32 of the switching element ISE, a flip-flop associated to this inlet indicates to which set of inlets I1/16 or I17/32 this inlet belongs. Via multiplexers (not shown) the SRT of the incoming cell is applied to the input CI of the input register IR, whilst the condition of the flip-flop is applied to the input IO. of the circuit RL. Subsequently, the self-routing tag SRT-is entered in the input register IR. SRT includes a 14-bit Internal Reference Number IRN also called multicast-tree-reference number, the above 14-bit Routing Control Address RCA and the above 5-bit routing-control-code RCC. Afterwards the RCA is entered in the shift register SR.

The internal reference number IRN here is a number used within the switching network to identify the point-to-multipoint communication to which a cell pertains. It is obtained at the entry of the switching network by translation of an external protocol label identifying the communication.

As already mentioned, the routing control address RCA is the address field or part of the self-routing tag SRT. It generally contains the output-port-address OPA which is the destination address in the switching network, i.e. the identity of the switching network output(s) to which the cell has to be transferred (routed) through this switching network. Because the switching element ISE under consideration belongs to a particular stage of the switching network, it is clear that only a portion of this output-port-address OPA is required by the switching element ISE to perform point-to-point transfer of an incoming cell to a given routing group comprising one or more of its outlets O1/32.

It is to be noted that the address part RCA of the self-routing tag SRT may also contain the identity of the above physical output or that of the dedicated outlet. It is also possible that the latter identities are contained in an other part of SRT leaving RCA free for containing the OPA.

The routing-control-code RCC is indicative of a particular sequence of routing functions to be executed by the successive switching elements ISE of the switching network through which a cell is transferred. Such a sequence of routing functions is called a transfer pattern. This means that a same routing-control-code RCC may lead to the execution of different routing functions in different switching elements ISE. In other words, the routing control code RCC is indirectly indicative of the routing function to be executed in each ISE for a given transfer pattern. The routing parameters of this routing function are obtained by using the routing-control-code RCC as a pointer to select a data word in the routing-control-code-translation memory RCCTM. As described above such a data word comprises RT, EF, RPI and RPO and its contents is thus dependent of the switching network stage to which the switching element ISE pertains.

The routing type code RT is decoded in the routing type decoder TD which accordingly activates one of its enable signals RS, MC, ES, DI or PH indicative for the above routing functions "group-routing", "multicast-routing", "dedicated-routing", "distribution" or "physical-routing" respectively.

The reflection indicator or bit EF is at the logical level 1 when the transfer direction has to be changed, i.e. that the third (C) or the fourth (D) transfer direction has to be used instead of the "normal" first (A) or second (B) transfer direction. The cell is then said to be reflected and is transferred either from an inlet of the first set I1/16 to an outlet of the second set O17/32, i.e. according to the third transfer direction (C), or from an inlet of the second set I17/32 to an outlet of the first set O1/16, i.e. according to the fourth transfer direction (D). In the other case, i.e. when EF is at the logical level 0, no reflection has to be performed and the first (A) or the second (B) transfer directions are used. The reflection indicator EF and the above direction indicator IO are applied to distinct inputs of the gate XOR which provides an output control signal for the direction selector RD. In function of this control signal this selector RD selects either the first set RPI or the second set RPO of the routing-mode parameters from the data word selected by the routing-control-code RCC. Each of the routing-mode parameters RPI and RPO define a portion of the output-port-address OPA contained in that routing control address RCA which is then stored in SR and is to be transcoded for obtaining the identity of, e.g., a single routing group. Each set RPI or RPO is constituted by a 4-bit position indicator POS and a 2-bit size indicator RGS. The position indicator POS indicates the begin position of the first bit of the above portion of the output-port-address OPA which is required by the switching element ISE as identity of the routing group to which the cell has to be transferred whilst the size indicator RGS gives the number of bits to be read in OPA from this being position. In practice, the position indicator POS controls the shift register SR in such a way that OPA is shifted therein over a number of steps (bits) such that the predetermined portion thereof occupies the most left position in this register SR. The size indicator RGS indicates how many bits out of this portion of the OPA have to be used for obtaining the identity of a single routing group by transcoding these bits, the maximum number of bits being 3 in this example. For this reason the 3 left hand outputs (one output per bit) of SR are applied to the group decoder GD directly, via AN1 and via AN2 respectively, AN1 and AN2 being controlled by respective ones of the 2 bits of RGS. The output of GD is an 8-bit word which indicates the identity of a single routing group and is applied to one of the 8-bit inputs of the selector MS. Moreover, each bit of the 8-bit output word of GD corresponds to the identity or address of one routing group, i.e. that only one bit of this word is, e.g., at the logical level 1 whilst the other bits are at the logical level 0. To be noted that depending on the value of RGS the single identity bit belongs to a group of 2, 4 or 8 bits.

Simultaneously with the transcoding of the above portion of the OPA, the 14-bit internal routing number IRN stored in IR is used to select a 8-bit mask word MSK in the memory MCM by pointing to this memory. As already mentioned above this mask word MSK identifies a plurality of routing groups (which relate to the branches of the concerned multicast tree reference number IRN at that ISE stage), i.e. that more than 1 bit thereof are at the logical level 1. It is applied to the other 8-bit input of the selector MS.

Depending on the enabling signal RS or MC provided by the routing function decoder TD being activated, either the 8-bit word provided by GD or that generated by MCM is supplied to the output GL of the selector MS. In other words, either the identity of a single routing group or the identities of a plurality of routing groups are provided at this output GL.

In case "physical-routing" PH is selected, after the OPA has been shifted in the shift register SR, the 5 most left bits thereof define the binary identity of a physical outlet O1/32. This identity appears on the output PO and is used when also the physical-routing enabling signal PH is activated.

The particular case of selecting any of the 32 outlets O1/32, i.e. the case of distribution, is not considered in detail here as it requires no further treatment in the routing logic RL. However, it corresponds to the activation of the distribution enabling signal DI.

In case the dedicated-routing enabling signal ES is activated this allows the cell to be transferred to a special outlet (not shown) of the switching element ISE.

From the above it follows that the RCC value indicative of a given transfer pattern is translated by using the memory RCCTM and that the information obtained therefrom is used to transcode a portion of the routing control address RCA, whilst the IRN is translated by using the memory MCM.

Also in case a switching element ISE is only used unidirectionally, i.e. for a single transfer direction, the memory RCCTM only records the data words for one routing group field or one set of routing-mode parameters, e.g. RPI, Besides, in such a case, it does not need to store a reflection indicator EF, It is also to be noted that instead of providing a flip-flop per inlet I1/32 in an ISE used for 2 transfer directions, it would also be possible to provide a bit in the self-routing tag SRT to indicate in which transfer direct/on, incoming or outgoing, the cell is currently transferred in the switching network. Then, when and if reflection is performed this bit has to be inverted to indicate that the cell will now go in the other transfer direction through the switching network. This possibility is not discussed in detail here.

It is also to be noted that commonly assigned copending patent application filed on 13 Mar. 1991 under Ser. No. 07/668,937 (which claims priority from an application filed in Europe on 14 Mar. 1990) and entitled "Communication switching module" discloses a method to fill the routing-control-code-translation memory RCCTM of the switching element ISE with the appropriate routing parameters during the initialization phase of the switching network.

Finally, it is also to be noted that the above routing parameters may be alternatively included in the self-routing tag SRT associated to the cell of information. This may for instance be realized by reserving i bit of SRT for each required routing parameter and for each switching element ISE when the indicator depends on the ISE stage number. Different routing functions can thus be executed by different switching elements ISE. It is also possible to define a reflection or change-of-direction bit in the self-routing tag SRT for indicating in which stage of the switching network, i.e. in which switching element a reflection or change of transfer direction has to be performed.

While the principles of the invention have been described above in connection with specific apparatus and particular numerical figures, it is to be clearly understood that this description is made only by way of example and not as a limitation on the scope of the invention.

I claim:

1. A self-routing multi-stage switching network constructed from identical switching elements arranged in a plurality of stages, each said identical switching element comprising a plurality of inlets,
   at least three outlets arranged in a plurality of routing groups including at least one intermediate routing group associated with more than one but less than all of said at least three outlets,
   routing means for selectively transferring cells of information from a selected one of said inlets to at least a selected one of said outlets, and
   routing logic means responsive to routing data included in a self-routing tag associated with said information and containing at least one output-port-address of said switching network, for selecting at least one of said routing groups by deriving the identity thereof from said routing data and for causing said routing means to transfer said information to a randomly selected outlet of each thus-selected routing group, wherein
   the arrangement of said outlets into said routing groups is different for different stages of said switching elements in said switching network,
   said arrangement is specified by first routing-mode parameters stored in each of said switching elements, and
   said arrangement is independent of said routing data included in the self-routing tag.

2. A self-routing multi-stage switching network according to claim 1, wherein
   said inlets are grouped in a first and in a second set of inlets,
   said outlets are grouped in a first and in a second set of outlets,
   said information is transferred from said first set of inlets to said first set of outlets according to a first transfer direction,
   said information is transferred from said second set of inlets to said second set of outlets according to a second transfer direction, and
   said routing logic means use distinct ones of said first routing-mode parameters for said first and for said second transfer direction respectively in order to perform different routing functions according to selected output direction.

3. A self-routing multi-stage switching network according to claim 2, wherein
   said information is transferred from said first set of inlets to said second set of outlets according to a third transfer direction,
   said information is transferred from said second set of inlets to said first set of outlets according to a fourth transfer direction, and
   said self-routing tag includes a reflection indicator specifying, when said reflection indicator is set, at which stage of said switching network the switching elements thereof has to transfer said information according to said third or to said fourth transfer direction.

4. A communication switching element for a self-routing multi-stage switching network, said switching element comprising
   a plurality of inlets,
   at least three outlets arranged in a plurality of routing groups including at least two intermediate routing groups associated with more than one but less than all of said at least three outlets,
   routing means for selectively transferring cells of information from a selected one of said inlets to at least a selected one of said outlets, and
   routing logic means responsive to routing data included in a self-routing tag associated with said information and containing at least one output-port-address of said switching network, for selecting at least one of said routing groups by deriving the identity thereof from said routing data and for causing said routing means to transfer said information to a randomly selected outlet of each thus-selected routing group, wherein
   said switching element further comprises a multicast-branch-point memory containing the identities of a plurality of said intermediate routing groups for each of a plurality of multicast-tree-reference-numbers,
   said self-routing tag includes a multicast indicator indicating that said routing means has to transfer said information to a plurality of its associated routing groups when said multicast indicator is set, and
   said self-routing tag further includes a multicast-tree-reference-number which is used by said routing logic means to address said multicast-branch-point memory to thereby determine identities of the associated said routing groups.

5. A communication switching element for a self-routing multi-stage switching network, said switching element comprising
   a plurality of inlets,
   at least three outlets arranged in at least two routing groups, each of said routing groups including more than one but less than all of said at least three outlets, routing means for selectively transferring cells of information from a selected inlet to at least one selected outlet in accordance with a predetermined routing function selected from the group comprising a group-routing function associated with a transfer from one of said inlets to one of said routing groups, a multicast-routing function associated with a transfer from one of said inlets to at least two of said routing groups, and a distribution function associated with a transfer from one of said inlets to all of said outlets associated with a particular transfer direction, and routing logic means responsive to routing data included in a self-routing tag associated with said information and containing a routing-control-code which causes said routing logic means to select said predetermined routing function in accordance with said routing-control-code, each value of said routing-control-code identifying a specific transfer pattern constituted by a predetermined sequence of said routing functions to be executed by said switching elements through said switching network.

6. A communication switching element according to claim 5, wherein when the selected routing function is said group-routing function or said multicast-routing function, said routing logic means further selects at least one of said routing groups according to said selected routing function, and said information is transferred to one of said outlets belonging to said selected routing group.

7. A communication switching element according to claim 6, wherein different routing group arrangements are defined in various stages of switching elements in said switching network, said information is associated with an output-port-address of said switching network, and when said routing-control-code indicates a point-to-point routing has to be performed, said routing logic selects the corresponding routing group identity in said output-port-address by means of derived pre-assigned routing-mode parameters for the concerned value of said routing-control-code in said switching element.

8. A communication switching element according to claim 7, wherein said pre-assigned routing-mode parameters used to extract said routing group identity from said output-port-address include parameters defining in each switching element the position and size of a portion of said output-port-address which identifies the routing group to be selected.

9. A communication switching element according to claim 8, wherein said switching element further comprises a multicast-branch-point memory containing the identities of a plurality of said routing groups for each of a plurality of multicast-tree-reference-numbers, and other values of said routing-control-code indicate that a multicast-routing function has to be performed, in which case said routing logic means uses a multicast-tree-reference number included in said self-routing tag to address said multicast-branch-point memory and to thereby obtain the identities of the associated routing groups to which a copy of said information has to be transferred.

10. A communication switching element according to claim 9, wherein said inlets are grouped in a first and in a second set of inlets, said outlets are grouped in a first and in a second set of outlets, said information is transferred from said first set of inlets to said first set of outlets according to a first transfer direction, said information is transferred from said second set of inlets to said second set of outlets according to a second transfer direction, and said routing-control-code is used differently depending on the relevant said transfer direction so that distinct routing functions can then be performed for each of said transfer directions.

11. A communication switching element according to claim 10, wherein said information is transferred from said first set of inlets to said second set of outlets according to a third transfer direction, said information is transferred from said second set of inlets to said first set of outlets according to a fourth transfer direction, and said routing-control-code is used by said routing logic means to derive a reflection indicator to change the selected output direction.

12. A communication switching element according to claim 11, wherein said switching element further comprises a routing-control-code translation memory containing for each value of said routing-control-code appropriate routing parameters to be used by said routing logic means to identify the appropriate routing group or individual outlet to be selected, and said routing-control-code is used by said routing logic means to address said routing-control-code translation memory to thereby obtain the associated said routing parameters to identify the appropriate routing group or individual outlet to be selected.

13. A communication switching element according to claim 8, wherein said inlets are grouped in a first and in a second set of inlets, said outlets are grouped in a first and in a second set of outlets, said information is transferred from said first set of inlets to said first set of outlets according to a first transfer direction, said information is transferred from said second set of inlets to said second set of outlets according to a second transfer direction, and said routing-control-code is used differently depending on a required one of said transfer directions so that distinct routing functions can then be performed for each of said transfer directions.

* * * * *